United States Patent [19]

Dieckbernd et al.

[11] Patent Number: 4,905,446
[45] Date of Patent: Mar. 6, 1990

[54] APPARATUS FOR WRAPPING ARTICLES

[75] Inventors: Gary L. Dieckbernd, Roscoe; James W. Oberle, Machesney Park, both of Ill.

[73] Assignee: APV Crepaco, Inc., Rockford, Ill.

[21] Appl. No.: 275,972

[22] Filed: Nov. 25, 1988

[51] Int. Cl.⁴ .......................... B65B 11/08; B65B 9/02; B65B 57/02
[52] U.S. Cl. .......................... 53/77; 53/229; 53/373; 53/553; 156/358
[58] Field of Search ................. 53/73, 75, 76, 77, 229, 53/373, 553; 156/351, 358

[56] References Cited

U.S. PATENT DOCUMENTS

| | | |
|---|---|---|
| 3,453,801 | 2/1967 | Stohlquist . |
| 3,553,059 | 12/1968 | Stohlquist . |
| 3,727,365 | 4/1973 | Stohlquist ............... 53/229 |
| 3,729,894 | 5/1973 | Stohlquist ............... 53/76 |
| 3,782,072 | 1/1974 | Sorensen et al. ........... 53/229 |
| 3,982,380 | 9/1976 | Seragnoli ............... 53/77 |
| 3,988,876 | 11/1976 | Seragnoli ............... 53/77 |

Primary Examiner—John Sipos
Attorney, Agent, or Firm—Vernon J. Pillote

[57] ABSTRACT

An apparatus for wrapping articles of the type wherein articles are advanced along an article path into a curtain of heat sealable wrapping material, and upper and lower jaw assemblies are sequentially moved laterally of the article path into positions at the trail side of the article and then forwardly along the article path in a sealing run. The lower jaw assemblies each include a pair of spaced clamping jaw members having a jaw opening therebetween and a rotary heat sealing and cutting member is mounted for movement into and out of the jaw opening as the lower jaw assemblies move past a zone intermediate the ends of the sealing run. The upper jaw assemblies include upper jaw carriers that are guided for movement in a fixed path along the sealing run and upper jaw members that are shiftable relative to the upper jaw carriers. Cams are movable between an operative position to cam the upper jaw member downwardly into clamping engagement with the lower jaw during movement along the sealing run, and an inoperative position to allow the upper jaw members to remain out of clamping engagement with the lower jaw assembly.

12 Claims, 5 Drawing Sheets

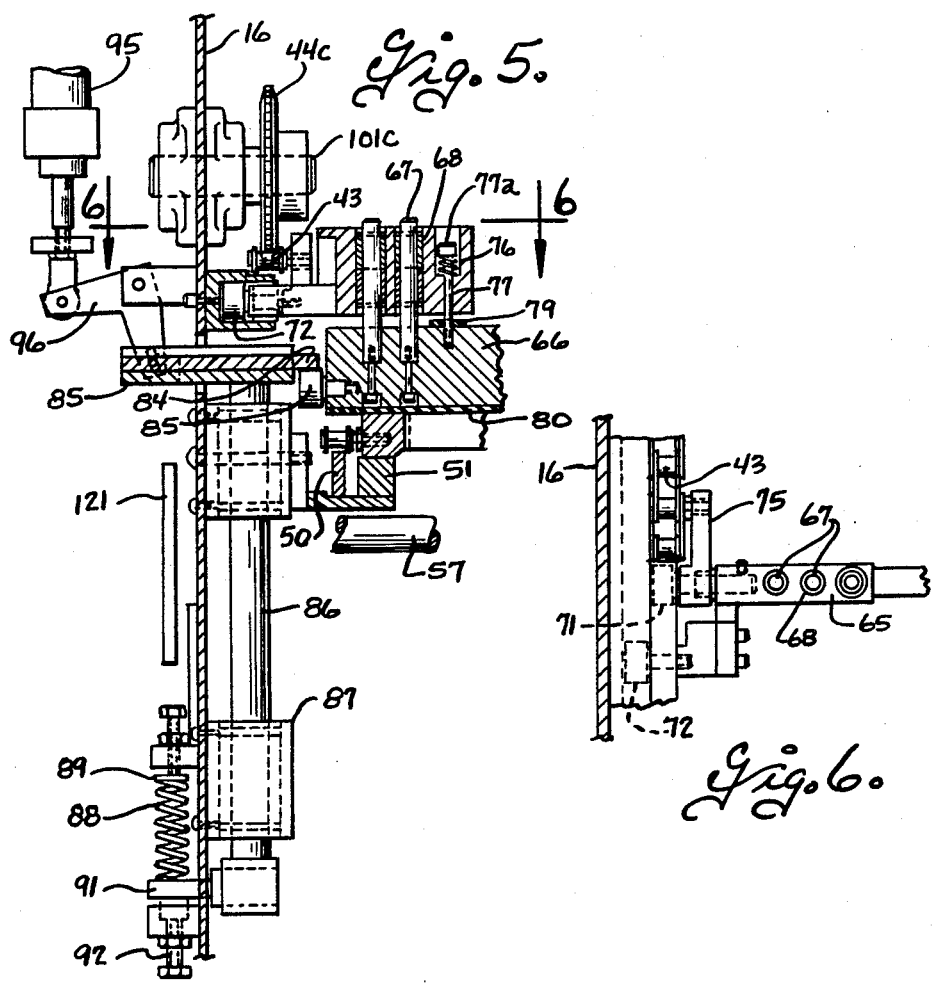

APPARATUS FOR WRAPPING ARTICLES

BACKGROUND OF THE INVENTION

Apparatus have heretofore have been made for example as disclosed in U.S. Pat. Nos. 3,453,801; 3,553,059; 3,727,365; 3,729,894 and 3,782,072, for wrapping articles in heat sealable wrapping material as they are advanced along an article path. In the apparatus disclosed in the above mentioned patents, upper and lower webs of heat sealable wrapping material are joined together to form a curtain of material extending crosswise of the article path, and articles are advanced through the curtain to draw the wrapping material along the lead side and along the top and bottom sides of the article. Upper and lower jaw assemblies, supported by upper and lower endless conveyors, are sequentially moved laterally of the article path into positions adjacent the trail side of the article and then forwardly along the article path in clamping engagement with the overlapping webs of material in a sealing run. In the apparatus disclosed in U.S. Pat. Nos. 3,453,801; 3,553,059; 3,727,365 and 3,729,894, the upper jaw assemblies have an electrically energized heat sealing and cutting element mounted thereon to sever the overlapping portions of the web and to seal the overlapping portions of the web at each side of the line of severance. In 3,782,072 the lower jaw assemblies were formed with a pair of clamping jaw members spaced apart in a direction lengthwise of the article path to provide a jaw opening therebetween and a sealing and cutting member was mounted for movement in a closed loop course into the jaw opening in the lower jaw assemblies as they move along a sealing run, to sever and seal overlapping portions of the web at opposite sides of the line of severance, and then out of the lower jaw opening before the upper and lower jaw assemblies reach the end of the sealing run, to allow the sealed webs to cool. Apparatus have also been made in which a cooling member was mounted for movement into and out of the jaw opening in the lower jaw assemblies as they move along the sealing run at a location downstream from the heat sealing and cutting member, to cool the heat sealed joints between the webs.

In the apparatus disclosed in U.S. Pat. No. 3,782,072, the jaw assemblies were spaced apart along the upper and lower conveyors a distance substantially greater then the length of the sealing run, and the jaws are separated at the end of the sealing run to allow the curtain to retract into engagement with the lead side of the next succeeding article. However, at high operating speeds it was found that, in the absence of a succeeding article, the joined webs would frequently not retract fully to the inlet end of the sealing run before the succeeding pair of clamping jaws commenced movement along the sealing run, so that the apparatus continued to seal and sever sections of the joined webs when articles were not advanced through the wrapping machine. This not only wasted wrapping material but also presented the problem of removing of the severed sections of wrapping material from the wrapping apparatus. In addition, in the prior apparatus disclosed in the '072 patent, the sealing and cutting member would continue to cyclically engage the upper clamping jaw when articles were not being wrapped, and this caused additional wear and damage to the upper clamping jaws.

In the apparatus disclosed in U.S. Pat. No. 3,729,894, the heat sealing and clamping jaws are spaced apart along the jaw conveyors a distance less than the length of the sealing run, and provision was made for lowering the guides for the lower jaw assemblies in the absence of an article in advance of the opposed pair of jaw assemblies, to prevent sealing and severing of sections of the webs under these conditions. However, this arrangement wherein the guides for the lower clamping jaws are shifted downwardly in the absence of an article, is not adapted for use in a wrapping apparatus of the type disclosed in U.S. Pat. No. 3,782,072 in which a heat sealing and cutting member is mounted for movement sequentially into and out of a jaw opening in the lower jaw assembly as it moves along the sealing run.

SUMMARY OF THE INVENTION

The present invention relates to improvements in apparatus for wrapping articles of the type disclosed in U.S. Pat. No. 3,782,072, and wherein endless type upper and lower jaw conveyors have generally horizontal sections extending forwardly along an article path in a sealing run in which one upper and one lower jaw assembly move in an opposed pair, and a generally horizontal heat sealing and cutting member is driven in timed relation with the upper and lower conveyors for movement in a closed loop course sequentially into a jaw opening in the lower jaw assembly as it moves past an intermediate zone of the sealing run to sever and seal overlapping portions of the webs, and then out of the lower jaw opening before the upper and lower jaw assemblies reach the end of the sealing run to allow the sealed webs to cool.

It is an object of the present invention to provide an apparatus for wrapping articles of the type described above and in which the upper jaw assembly can by shifted upwardly as it moves along the sealing run away from the lower jaw assembly to interrupt heat sealing and cutting of webs when articles are not being advanced through the wrapping apparatus.

Accordingly the present invention provides upper jaw assemblies which include upper jaw carrier means mounted on the upper jaw conveyor means and an upper jaw member mounted on the upper jaw carrier means for movement therewith and for limited movement relative thereto in a direction orthogonal to the path of movement of the upper jaw assembly along the sealing run, with means on the upper jaw member and upper jaw carrier means yieldably urging the upper jaw members in a direction upwardly relative to the associated jaw carrier means. Cam follower means are provided on each upper jaw member and cam means are mounted on a support structure for movement to a an operative position in the path of movement of the cam follower means on the upper jaw members to cam the upper jaw member downwardly relative to the associated upper jaw carrier means as a jaw assembly moves along the sealing run, and to an inoperative position out of the path of movement of the cam follower means on the upper jaw member.

The cam means is advantageously yieldably biased in a direction toward the upper section of the lower jaw conveyor means, to yieldably press the upper jaw member into engagement with the lower jaw assembly as it moves along the sealing run. The cam means is preferably mounted for movement along a generally horizontal path laterally of the article path, into and out of the path of movement of the cam follower means on the upper jaw member.

BRIEF DESCRIPTION OF THE DRAWINGS

FIG. 5 is a fragmentary vertical sectional view taken on the plane 5—5 of FIG. 1;

FIG. 6 is a fragmentary horizontal sectional view taken on the plane 6—6 of FIG. 5;

FIG. 7 is a fragmentary sectional view taken on a plane 7—7 of FIG. 1; and

FIG. 8 is a fragmentary sectional view taken on the plane 8—8 of FIG. 1.

DETAILED DESCRIPTION

The apparatus of the present invention is generally adapted for wrapping articles in heat sealable wrapping materials. As used herein, the term "articles" includes single items as well as groups of items. The heat sealable wrapping material is a thermoplastic film and may for example comprise polyethylene, polyvinyl chloride, etc. The thermoplastic films are preferably of the so called heat shrinkable films, to enable heat shrinking of the wrapper into tight conformity with the article, after the article has been wrapped.

The wrapping apparatus is generally the type disclosed in the aforementioned U.S. Pat. No. 3,782,072 owned by the assignee of the present invention, and the disclosure in that patent is incorporated herein by reference. In general, the wrapping apparatus has a stationary support structure including laterally spaced side frames 15, 16. As more fully disclosed in the aforementioned patent, upper and lower webs of heat sealable wrapping material W1 and W2 are supplied from rolls and passed over web tensioning devices and guides and joined together by a joint or weld indicated at X in FIG. 1, to form a curtain of heat sealable material extending crosswise of the path of advance of the articles.

Figure 1:
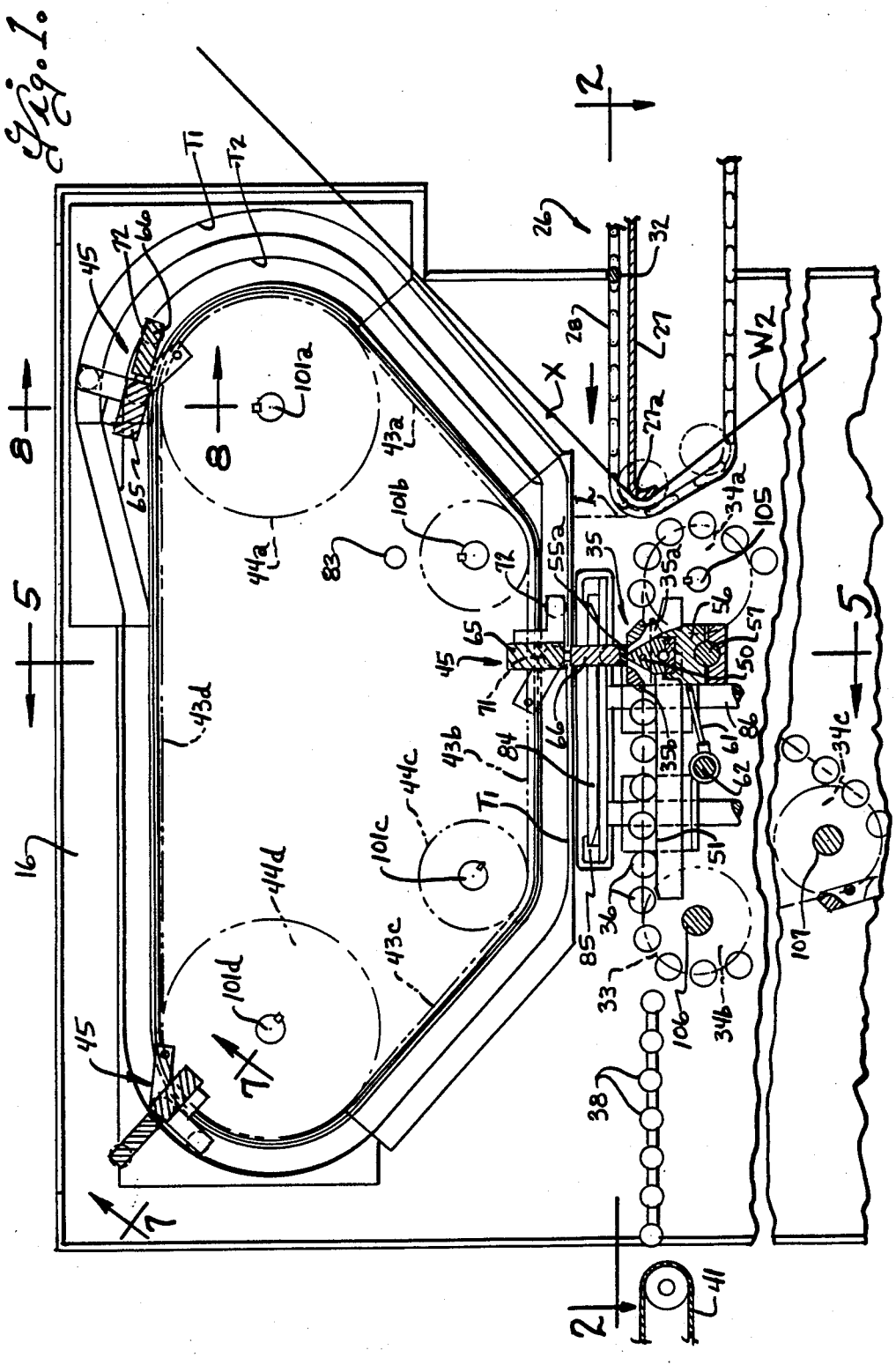
FIG. 1 is a longitudinal vertical sectional view through the wrapping machine.

An inlet conveyor or transfer mechanism 26 is arranged to advance articles in spaced succession along a path into one side of the curtain and until the trail side of the article reaches a preselected location indicated by a point designated L in FIG. 1. The inlet conveyor includes a support plate or platform 27, the outlet end 27a of which extends to a point adjacent the location L, and an endless flight conveyor including laterally spaced chains 28 that are entrained over sprockets 29 at the outlet end, and article engaging elements 32 that extend between the chains 28 to advance articles along the platform.

A lower endless-type jaw conveyor means is mounted on the side frames and includes laterally spaced endless chains 33 entrained over sprockets 34a–34c. At least one, and preferably several lower jaw assemblies 35 are attached to the chains 33 and extend therebetween at locations spaced apart along the chain. Sprockets 34a and 34b are arranged to guide an upper section or run of the chains 33 in a generally horizontal path at a level adjacent the level of the platform 27 of the inlet conveyor, and sprocket 34c is disposed below the sprockets 34a and 34b to guide the lower endless chains in a return path below the upper run. A plurality of rollers 36 extend between the chains 33 at spaced locations intermediate the lower jaw assemblies, and are constructed for free axial rotation relative to the chains. Although the endless chains are themselves driven in a manner and for a purpose described hereinafter, the rollers 37 are free to turn about their own axes so as to effectively avoid propelling or advancing an article supported on the upper run. An outlet article guide, conveniently in the form of a stationary bed of rollers 38, extends from a location adjacent the outlet sprocket 34b at a level adjacent the level of the upper run of the lower jaw conveyor and a means such as a discharge conveyor 41 (FIG. 1) may be utilized to advance articles from the outlet guide to a shrink tunnel (not shown), if heat shrinkable wrapping material is used.

An upper endless-type jaw conveyor means is mounted on the side frames 15, 16 and includes laterally spaced endless chains 43 entrained over sprockets 44a, 44b, 44c and 44d. A plurality of upper jaw assemblies 45, herein shown three in number, are mounted on the chains 43 at locations spaced apart therealong corresponding to spacing of the lower jaw assemblies 35 on the lower conveyor chains. The upper jaw assemblies 45 are mounted for movement with the chains 43 in a closed loop course and sprockets 44b and 44c are positioned to guide the chains 43 along a generally horizontal lower run above the upper run of the lower jaw conveyor means. Sprocket 44a is spaced above sprocket 44b and offset in a direction opposite the direction of advance of the articles by the inlet conveyor 26, so as to guide the upper chains 43 along an inlet run 43a that is inclined downwardly and forwardly in the direction of article advance toward the lower run 43b. Sprocket 44d is spaced above and offset in the direction of advance of the articles from the sprocket 44c, to guide the chains 43 in an outlet run 43c inclined upwardly and in the direction of advance of the articles, and a return run 43d extends generally horizontally between the sprockets 44d and 44a.

Figure 2:
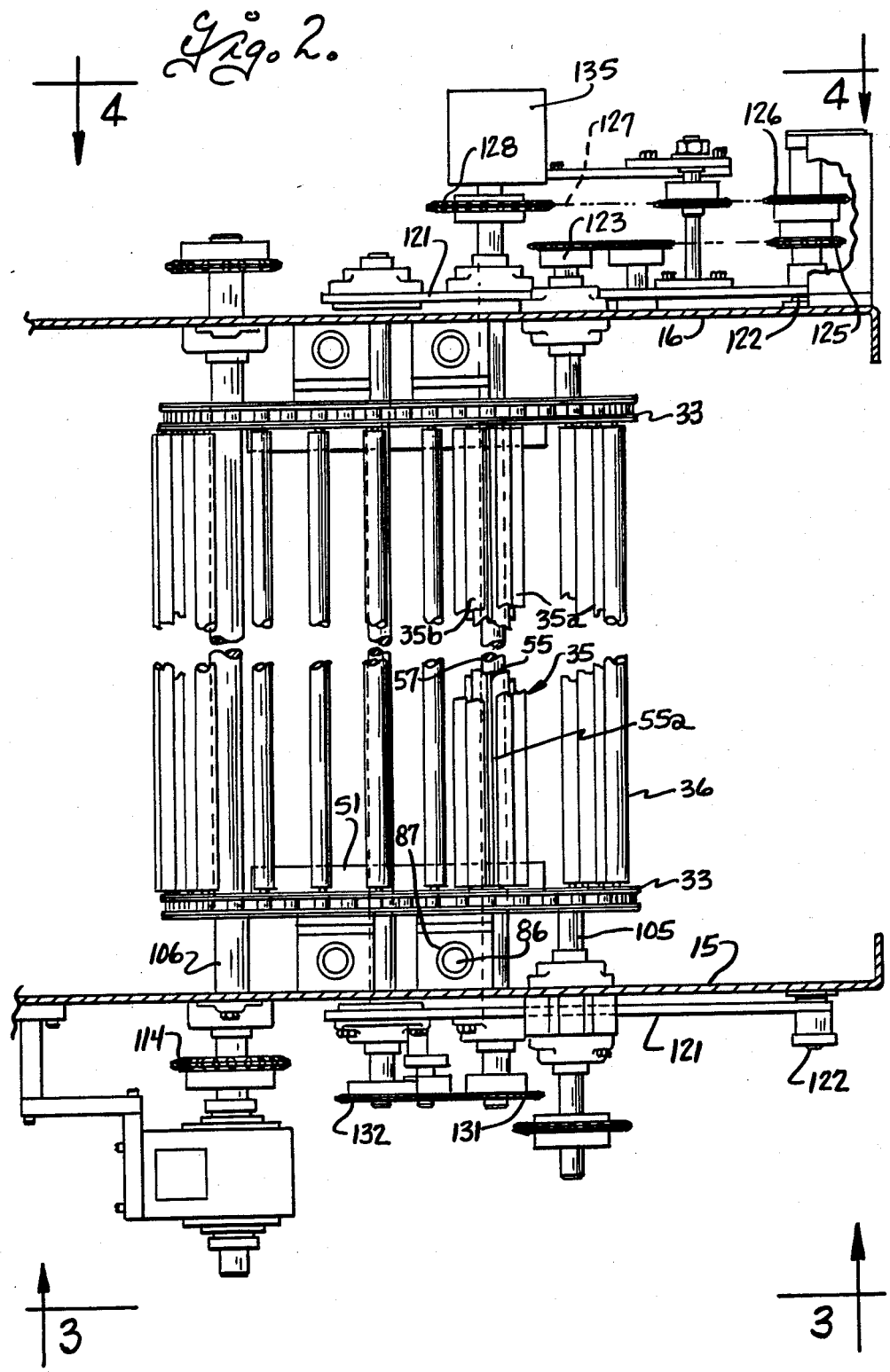
FIG. 2 is a horizontal sectional view taken on the plane 2—2 of FIG. 1.

As best shown in FIGS. 1 and 2, the lower jaw assemblies 35 each comprise a pair of clamping jaw members 35a, 35b which extend crosswise between the chains 33 and which are spaced apart in a direction lengthwise of the article path to define a jaw opening therebetween. As shown in FIG. 1, the jaw members 35a, 35b each have an upper seal face and the adjacent faces of the jaw member diverge downwardly and outwardly at opposite sides of the jaw opening. The chains 33 are preferably of the roller type and ride along lower guide rails 50 (FIG. 5) during movement along their upper run and jaw guides 51 underlie and support the lower jaw assemblies during movement along the sealing run.

An electrically heated sealing and cutting member 55 is mounted for movement in a closed loop course that extends generally tangent to the sealing run in a zone intermediate the ends of the sealing run. In the embodiment illustrated, the heat sealing and cutting member 55 is mounted as by arms 56 on a cross shaft 57 for rotation in a generally circular path tangent to the sealing run at a location intermediate inlet and the outlet sprockets 34a and 34b. The heat sealing and cutting member 55 is driven in a manner described more fully hereinafter, in timed relation with the movement of the lower jaw conveyor so as to move into the jaw opening between the jaw members 35a and 35b on the lower jaw assembly 35 as the lower jaw assembly moves past an intermediate zone, to sever overlapping portions of the webs and seal the severed ends of the webs. In the form shown where the sealing and cutting member is supported for rotation about the axis of shaft 57, the shaft is rotated to complete one revolution in the time required to advance the lower jaw conveyor a distance corresponding to the spacing between the adjacent lower jaw assemblies, and the movement of the lower jaw assembly is timed so that the position of the sealing and cutting member registers with the jaw opening in the lower jaw assembly as the sealing and cutting member moves past the top dead-center position shown in FIG. 1. The sealing and cutting member is rotated in a counter-clockwise direction as viewed in FIG. 1, so that the sealing and cutting edge 55a of the sealing and cutting member 55 travels in the same direction and at substantially the same speed as the lower jaw assembly, as the sealing and cutting member moves past top dead center.

In the preferred embodiment illustrated in FIG. 1, a seal cooling member 61 (see FIG. 1) is mounted on a shaft 62 for rotation in a circular path at a location downstream from the heat sealing and cutting member 55. The seal cooling member 61 is rotated in a manner described more fully hereinafter, in timed relation with the lower jaw conveyor means so as to move into and out of the jaw opening in the lower jaw assembly 35 as the latter is advanced along the sealing run, to cool the heat sealed edges of the webs.

As previously described, the upper and lower endless jaw conveyors are driven in timed relation with each other such that one upper and one lower jaw assembly move in an opposed pair forwardly along the article path in a sealing run. Each upper jaw assembly 45 includes an upper jaw carrier means 65 mounted for movement with the upper endless jaw conveyor chains and an upper jaw member 66 mounted on the upper jaw carrier means for movement therewith and for limited movement relative thereto in a direction orthogonal to the path of movement of the upper jaw assembly along the sealing run. As best shown in FIGS. 5-8, guide rods 67 are fixed to the ends of the upper jaw member 66 and are guidably supported in bushings 68 on the upper jaw carrier 65 for movement relative thereto along a jaw shift path defined by the axis of the guide pin 67 and perpendicular to the lengthwise axis of the jaw member 66. The jaw carriers 65 each have one cam follower roller 71 mounted thereon for rotation about an axis in the plane of the jaw shift path and parallel to the lengthwise axis of the upper jaw member 66, and a second cam track follower roller 72 mounted for rotation about an axis parallel to and offset from the upper jaw member 66. The rollers 71 and 72 are adapted to move in first and second cam tracks T1 and T2 on the side frame members and the first and second cam tracks have a generally horizontal lower run arranged to guide the rollers 71 and 72 in a manner such that the jaw shift path extends generally vertical as the upper jaw assembly moves along the lower run of the endless jaw conveyor. The upper jaw carriers are connected by a link 75 to the endless conveyor chains 43 and the links can pivot relative to the chains and relative to the upper carriers. The upper jaw members 66 are yieldably biased toward the associated upper jaw carrier 65, to normally move the upper jaw members to a raised position as the upper jaw assembly moves along the lower sealing run. As shown in FIG. 5, compression springs 76 are interposed between the upper jaw carriers and an abutment head 77a on pins 77 attached to the upper jaw members. A shock absorbing pad 79 of resilient material is advantageously interposed between the upper jaw member and the associated upper jaw carrier to reduce noise when the upper jaw member is raised by the springs 76. The upper jaw members are preferably provided with resilient sealing face 80 along the lower side, which face has a width to span the jaw opening in the lower jaw assembly to clamp the overlapped web of material to the spaced jaw members of the lower jaw assembly during movement along the lower sealing run.

Figure 3:
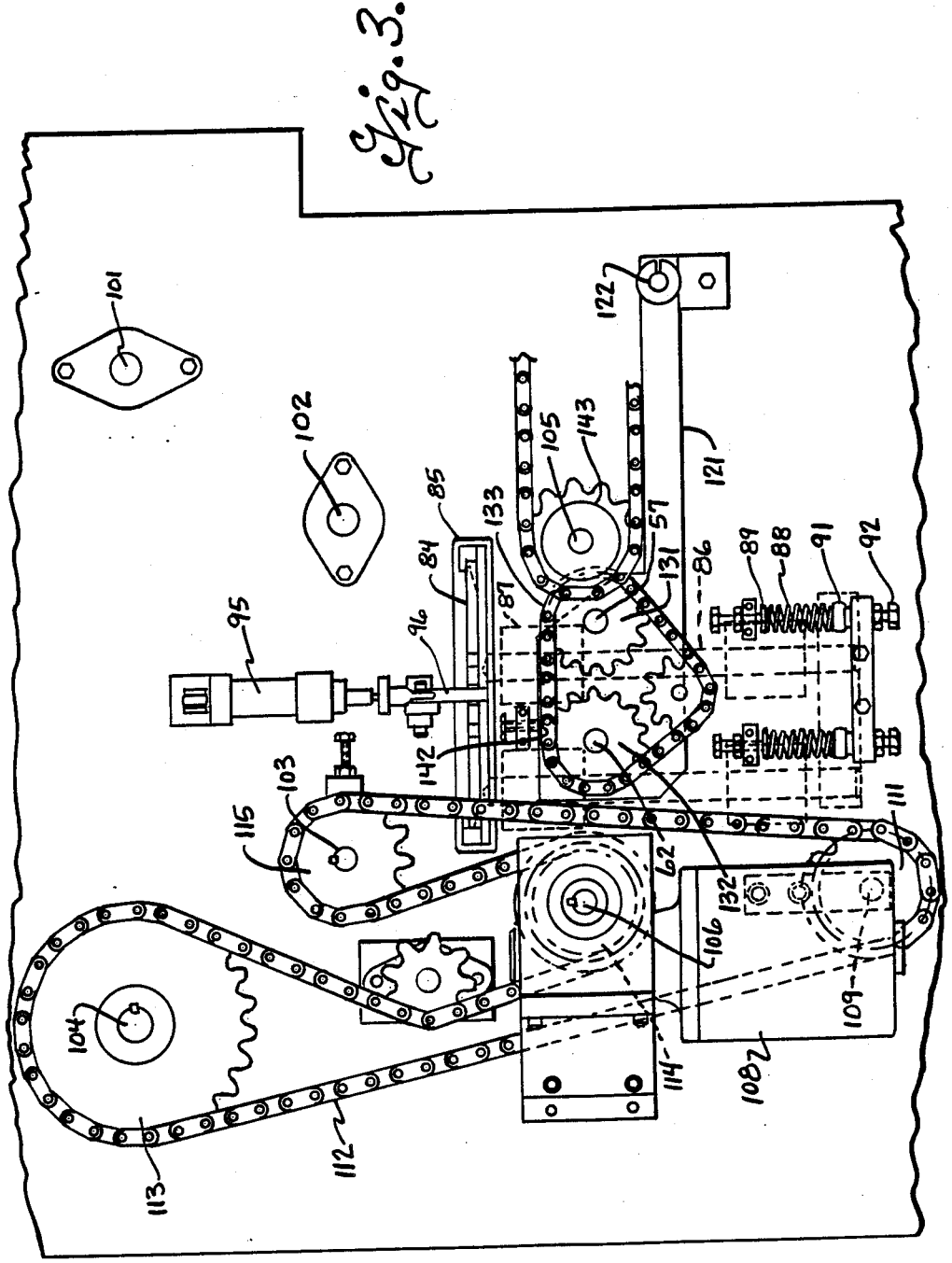
FIG. 3 is a side view taken on the plane 3—3 of FIG. 2.
Figure 4:
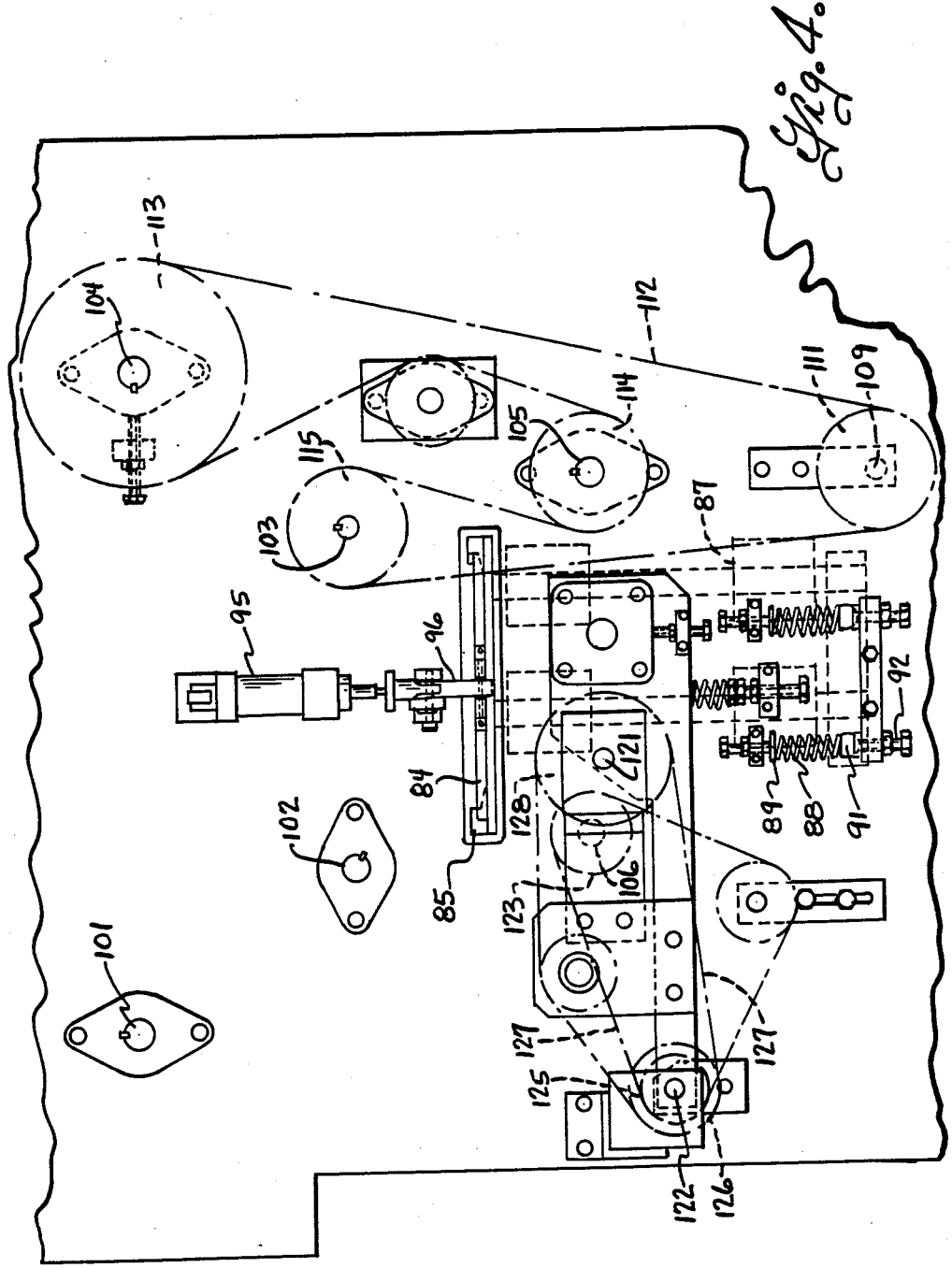
FIG. 4 is a side view taken on the plane 4—4 of FIG. 2.

The springs 76 are arranged to yieldably bias the upper jaw members toward the associated upper jaw carrier to a level such that the lower seal face 80 normally will be spaced above the associated lower jaw assembly when the jaw assembly is moved along the sealing run, and a cam 84 and cam follower 85 are provided for selectively camming the upper jaw member downwardly during movement along the lower sealing run, into clamping engagement with the associated lower jaw assembly. The cam follower 83 is in the form of a roller monted at each end of the upper jaw assembly for rotation about an axis paralleling the lengthwise axis of the upper jaw assembly, and the cam 84 is advantageously in the form of cam plate that is slidably supported in a guide 85 for movement along a generally horizontal path laterally of the article path, between a first or operative position in the path of movement of the cam followers 83 and a second or inoperative position spaced laterally outwardly from the path of movement of the cam followers 83. The cam guides 85 are mounted by rods 86 and bushings 87 on the side frames for limited vertical movement relative thereto and the rods 86 and cam guides 85 are yieldably biased downwardly by springs 88 interposed between an abutment 89 adjustably mounted on the side frame, and an abutment 91 fixed to the lower ends of the guide rods 86. Downward movement of the rods 86 is adjustably limited by adjustable stops 92 and the downward pressure exerted on the rods 86 can be adjusted by the adjustable abutments 89. The cam plate 84 is selectively shifted from a first or operative position in the path of movement of the cam followers 83 on the upper jaw assembly as shown in FIG. 5 to a second or inoperative position retracted outwardly from the path of movement, by an actuator such as a pneumatic actuator 95 mounted on the side frame and connected through a bell crank lever 96 to the cam plate. Article sensing means 83 (FIG.1) such as photoelectric eye assembly is provided for sensing the presence or absence of an article in front of the upper and lower jaw assemblies as they move along the sealing run, and the photoelectric eye assembly is arranged to operate a valve (not shown) to actuate pneumatic actuator 95 and shift cam plate 84 to its inoperative position in the absence of an article. As shown in FIGS. 1, 3 and 4 the ends of the cam plate 84 are beveled to aid in guiding the cam follower 85 onto the underside of the cam plate when the cam plate is in its operative position. The downward movement of the cam plate is limited by the adjustable stop 92 to a position such that the cam follower rollers 85 can ride onto the underside of the cam plate, and the clamping pressure applied by springs 88 to the upper clamping jaws as they move along the lower sealing run, can be adjusted by adjustable abutments 89.

As best shown in FIG. 5-8, the upper jaw carrier guide rollers 71 and 72 are horizontally offset from each other, and the cam track T2 is disposed in a vertical plane that is horizontally offset in a direction laterally outwardly from the vertical plane of the cam track T1, and the guide rollers 71 and 72 on the jaw carriers 66 are arranged to extend into the respective cam tracks T1 and T2. The cam tracks T1 and T2 are arranged to guide the upper jaw carrier means through the upper closed loop course and to orient the upper jaw carrier means and upper jaw member so that the upper jaw shift path is disposed substantially vertical as the upper jaw carrier means moves along the inlet run 43a and along the lower sealing run 43b of the upper jaw conveyor chains. As will be seen from FIG. 1, the tracks T1 and T2 follow substantially the same path along the lower run 43b and along the outlet run 43c of the upper jaw conveyor chains, and along a portion of the return run 43d. The tracks T1 and T2, however, diverge relative to each other before the jaw assemblies move into the inlet run 43a of the upper jaw conveyor chains and they follow relatively different paths as shown in FIG. 1 along the inlet run to maintain the upper jaw assemblies with the jaw shift path substantially vertical as the jaw assemblies move along the inlet run. The tracks T1 and T2 then converge relative to each other at the inlet end of the sealing run and follow the same path along the sealing run to guide the jaw carriers and upper jaw members with the jaw shift path disposed substantially vertical.

A drive for operating the various parts of the wrapping apparatus in timed relation is best shown in FIGS. 2-4. The sprockets 44a-44d for the upper endless chains 43 are fixed to stub shafts 101-104 respectively that are rotatably mounted on an associated one of the side frames. The sprockets 34a of the lower conveyor chains are fixed to stub shafts 105 that are rotatably mounted on the associated side frame and the sprockets 34b and 34c are respectively fixed to cross shafts 106 and 107 (FIG.1) that extend between and are rotatably mounted on the side frames 15, 16. As shown in FIG. 3, a drive motor 108 drives a main drive shaft 106 that extends between and is rotatably mounted on the side frames. A drive sprocket 114 is fixed to the shaft 106 adjacent each side frame and a drive chain 112 is entrained over each drive sprocket 114 and over a sprocket 113 on stub shaft 104, sprocket 111 on cross shaft 109 and a sprocket 115 on stub shaft 103. The sprockets are arranged to drive the upper and lower jaw conveyor chains 43 and 33 respectively at the same lineal speed and in timed relation with each other such that the upper and lower jaw assemblies move in opposed pairs along the sealing run. The shafts 57 and 62 for the heat seal member and cooling member 55 and 61 respectively, are mounted for limited vertical adjustment relative to the upper run of the lower jaw conveyor means. As best shown in FIGS. 2-4, arms 121 are mounted at pivots 122 on each of the side frames and the shafts 57 and 62 extend between the distal ends of the arms and are rotatably mounted thereon. As shown in FIGS. 2 and 3, a sprocket 123 fixed to lower jaw conveyor stub shaft 106 at one side of the machine, is connected through a chain 124 to a sprocket 125 for rotation about the axis of the pivot 122. A second sprocket 126 fixed to the sprocket 125, is connected through a chain 127 to a sprocket 128 on the shaft 57 of the heat sealing and cutting member. Sprockets 131 and 132 are fixed to the shafts 57 and 62 at the other side of the machine and drivingly interconnected by a chain 133 to drive the heat sealing and cutting member 55 and cooling member 61 in timed relation with each other. The sprockets 125, 126 and 128 are sized to drive the shaft 57 and hence the heat sealing and cutting member through one revolution as the lower jaw conveyor chains 33 advance a distance corresponding to the spacing between adjacent lower jaw assemblies on the lower conveyor. An electrical commutator assembly 135 (FIG. 2) is mounted on the end on the shaft 57, to supply electrical current to the electrical heater in the heat sealing and cutting member. As shown in FIG. 4, the arms 121 are yieldably biased upwardly by springs 141 and an adjustable stop 142 (FIG. 3) is provided to adjustably limit the upward movement of the arms and hence the upper position of the heat sealing and cutting member. A drive sprocket 143 is mounted on one of the lower conveyor stub shafts 106 and is connected through a chain 144 (FIG. 3) to the inlet flight conveyor 26, to drive the inlet conveyor at a lineal speed equal to the lineal speed of the upper and lower sealing jaws as the latter advance along the sealing run.

From the foregoing it is believed that the construction and operation of the wrapping apparatus will be readily understood. The upper and lower endless jaw conveyors are driven in timed relation with each other to move the upper and lower jaw assemblies in opposed pairs along the sealing run. The upper jaw member 75 is supported on the jaw carrier 65 for movement relative thereto along a jaw shift path and the cam track followers 71 and 72 on the jaw carrier are guided in the tracks T1 and T2 in a manner to orient the jaw shift path generally upright as the upper jaw assembly moves along the sealing run. Cams 84 are movable between an operative position in the path of movement of the follower rollers 75 on the ends of the upper jaw member to cam the upper jaw member downwardly into clamping engagement with the associated lower jaw assembly as they move along the sealing run. The cam 84 is also supported in the guide 85 for limited vertical movement and is yieldably biased in a downward direction to resiliently clamp the upper jaw to the lower jaw assembly during movement along the sealing run. Cam 84 is shiftable in a direction laterally of the path of movement of the cam followers 75 on the sealing member to an inoperative position under the control of article sensing means 85, so that the upper jaw member can remain in a raised or retracted position in the absence of an article during movement along the sealing run, to prevent clamping and heat sealing of the webs.

The cam tracks T1 and T2 are shaped so as to maintain the jaw shift path for the upper jaw member substantially upright as the jaw assemblies move along the sealing run and to also orient the upper jaw assemblies so that the upper jaw member is disposed substantially upright as it moves downwardly and forwardly along the inlet run to the inlet end of the sealing run.

The embodiments of the invention in which an exclusive property or privilege is claimed are defined as follows:

1. In an apparatus for wrapping articles in heat sealable sheet material as they move along a generally horizontal article path including a support structure, an endless-type lower jaw conveyor means having a plurality of spaced lower jaw assemblies extending crosswise of the article path, an endless-type upper jaw conveyor means having a plurality of upper jaw assemblies extending generally horizontally crosswise of the article path, the upper and lower jaw conveyor means respectively having generally horizontal lower and upper sections thereof extending forwardly along the article path in a sealing run in which one upper and one lower jaw assembly move in an opposed pair along the sealing run, lower guide means for guiding the lower jaw assemblies during movement along the sealing run, upper guide means for guiding the upper jaw assemblies during movement along the sealing run, a curtain of heat sealable material extending crosswise of the article path adjacent the inlet end of said sealing run, means for advancing an article along the article path into the curtain to draw the curtain along the top and bottom of the article and to position the article in front of an opposed pair of said jaw assemblies as they move toward the inlet end of said sealing run, each lower jaw assembly including a pair of lower clamping jaw members extending crosswise of the article path and spaced in a direction lengthwise of the article path to define a jaw opening therebetween, a generally horizontal heat sealing and cutting member extending crosswise of said article path and mounted for movement in a closed loop course extending generally tangent to said upper section of said lower jaw conveyor means in a zone intermediate the ends of sealing run, means for driving said sealing and cutting member in timed relation with said lower jaw conveyor means along said closed loop course sequentially into the jaw opening in each lower jaw assembly as it moves past said intermediate zone to sever and seal overlapping portions of the upper and lower webs at opposite sides of the severance and then out of said lower jaw opening before the upper and lower jaw assemblies reach the end of the sealing run to allow the sealed webs to cool, the improvement wherein each upper jaw assembly includes upper jaw carrier means mounted on the upper jaw conveyor means and an upper jaw member mounted on the upper jaw carrier means for movement therewith and for limited movement relative thereto in a direction orthogonal to the path of movement of the upper jaw assembly in said sealing run, means on said upper jaw member and said upper jaw carrier means yieldably urging the upper jaw member in an upward direction relative to the associated upper jaw carrier means as the upper jaw assembly moves along said sealing run, said upper jaw guide means including: (a) means for guidably supporting the upper jaw carrier means during movement along the sealing run; (b) cam follower means on each upper jaw member; and (c) cam means mounted on support structure for movement relative thereto, means for moving the cam means to a first position in the path of movement of said cam follower means on upper jaw member to cam the upper jaw member downwardly relative to the upper jaw carrier means as the upper jaw assembly moves along the sealing run, said means for moving the cam means being operable to move the cam means to a second position out of the path of movement of said follower means on the upper jaw member.

2. Apparatus according to claim 1 including means yieldably urging said cam means in a direction toward the upper section of said lower jaw conveyor means.

3. Apparatus according to claim 2 wherein said cam means is mounted for movement along a generally horizontal path crosswise of said article path between said first and second positions thereof.

4. Apparatus according to claim 1 wherein said cam means is mounted for movement along a generally horizontal path laterally of said article path between said first and second positions thereof.

5. Apparatus according to claim 1 wherein said means mounting the cam means on the support structure includes cam guide means slidably supporting the cam means for movement along a generally horizontal path crosswise of the article path, means mounting the cam guide means on the support structure for limited vertical movement relative thereto, and means yieldably urging the cam guide means downwardly relative to the support structure.

6. Apparatus according to claim 1 including article sensing means for sensing the absence of an article in front of the upper jaw assembly as it moves along the sealing run and for actuating the cam moving means to move the cam means to said second position in the absence of an article.

7. In an apparatus for wrapping articles in heat sealable web material as they move along a generally horizontal article path including, a support structure, laterally spaced endless-type lower jaw conveyor chains at opposite sides of said article path, a plurality of lower jaw assemblies extending between and connected to said lower jaw conveyor chains for movement therewith along a closed loop lower jaw course having a generally horizontal upper sealing run and a return run, lower guide means for guiding the lower jaw assemblies during movement along the upper run of the lower jaw course, laterally spaced endless-type upper jaw conveyor chains at opposite sides of said article path, a plurality of upper jaw assemblies extending between and connected to the upper jaw conveyor chains for movement therewith along a closed loop upper jaw course having a generally horizontal lower sealing run and an upper run and inlet and outlet runs extending between the upper and lower runs, upper guide means for guiding the upper jaw assemblies during movement along the lower run of said upper jaw course, means for driving said upper and lower jaw conveyor chains in timed relation to move an upper jaw assembly in opposed relation to a lower jaw assembly in a forward direction along the article path along the sealing runs thereof, means for supporting a curtain of heat sealable material extending crosswise of the article path adjacent an inlet end of the sealing runs, means for advancing an article along the article path into the curtain, each lower jaw assembly including a pair of lower jaw members spaced apart to define a jaw opening therebetween, a generally horizontal heat sealing and cutting member extending crosswise of said article path and mounted for movement in a closed loop course tangent to said upper sealing run of said lower jaw course in a zone intermediate the ends of the sealing run, means for driving the sealing and cutting member in timed relation to the lower jaw conveyor chains sequentially into and out of the jaw opening in a lower jaw assembly as it moves past said intermediate zone, the improvement wherein each upper jaw assembly includes upper jaw carrier means mounted on the upper jaw conveyor chains, and an upper jaw member mounted on the upper jaw carrier means for movement therewith and for limited movement relative thereto in a direction orthogonal to the movement of the upper jaw assembly in said lower sealing run, means yieldably urging the upper jaw member in an upward direction relative to the associated upper jaw carrier means as the upper jaw assembly moves along the lower sealing run, said upper jaw guide means including: (a) cam track means on the support structure at opposite sides of the article path, cam track followers on the upper jaw carrier means guidably supporting the upper jaw carrier means during movement along the lower sealing run; (b) cam follower means on each upper jaw member; and (c) cam means mounted on the support structure at each side of the article path; means for moving the cam means to a first position in the path of movement of the cam follower means on the upper jaw member to cam the upper jaw member downwardly relative to the upper jaw carrier means as the upper jaw assembly moves along the lower sealing run, said means for moving the cam means being operable to move the cam means to a second position out of the path of movement of the cam follower means on the upper jaw member.

8. Apparatus according to claim 7 wherein said means mounting the cam means on the support structure includes cam guide means slidably supporting the cam means for movement along a generally horizontal path laterally of the article path, means mounting the cam guide means on the support structure for limited vertical movement relative thereto, and means yieldably urging the cam guide means downwardly relative to the support structure.

9. Apparatus according to claim 7 including article sensing means for sensing the absence of an article in front of the upper jaw assembly as it moves along the lower sealing run and for actuating the cam moving means to move the cam means to said second position in the absence of an article.

10. Apparatus according to claim 7 wherein said cam track means includes first and second closed loop cam tracks at each side of the article path, the first and second cam tracks being relatively offset in a direction laterally of the article path, the cam track followers including a first roller on the upper jaw carrier means arranged to extend into the first cam track and a second roller mounted on each upper jaw carrier means at a location spaced from the first roller and arranged to extend into the second cam track, said first and second closed loop cam tracks being arranged to guide the upper jaw carrier means through the upper closed loop course and to orient the upper jaw carrier means with the upper jaw shift path substantially vertical as the upper jaw carrier means moves along the inlet and lower sealing runs of the upper closed loop course.

11. Apparatus according to claim 10 wherein said first and second rollers are horizontally offset when the upper jaw carrier means is in the lower run of the closed loop course, said first and second cam tracks having the same path along the lower run and outlet run, and relatively different paths along the inlet run.

12. Apparatus according to claim 7 wherein said cam track means includes first and second closed loop cam tracks at each side of the article path, the first and second cam tracks being horizontally offset in a direction laterally of the article path, the cam track followers including a first roller on the upper jaw carrier means arranged to extend into the first cam track and a second roller mounted on each upper jaw carrier means at a location spaced from the first roller and arranged to extend into the second cam track, said first and second closed loop cam tracks being arranged to guide the upper jaw carrier means through the upper closed loop course and to position the upper jaw carrier means with the upper jaw shift path substantially vertical as the upper jaw carrier means moves along the inlet and lower runs of the upper closed loop course.

* * * * *